United States Patent [19]
Pradel

[11] Patent Number: 5,400,881
[45] Date of Patent: Mar. 28, 1995

[54] VIBRATION DAMPER UNIT

[75] Inventor: Robert Pradel, Röthlein-Heidenfeld, Germany

[73] Assignee: Fichtel & Sachs AG, Schweinfurt, Germany

[21] Appl. No.: 119,405

[22] Filed: Sep. 9, 1993

[30] Foreign Application Priority Data

Sep. 10, 1992 [DE] Germany .................. 42 30 237.4

[51] Int. Cl.6 .................. F16F 9/19; B60G 13/08
[52] U.S. Cl. .................. 188/322.14; 188/314
[58] Field of Search .............. 188/299, 314, 312, 318, 188/322.14, 322.17, 322.18, 322.16

[56] References Cited

U.S. PATENT DOCUMENTS

| 2,616,711 | 11/1952 | Whisler, Jr. et al. ...... 188/322.14 X |
| 4,546,959 | 10/1985 | Tanno ..................... 188/299 |
| 4,813,519 | 3/1989 | Matsubara et al. ........... 188/299 |

FOREIGN PATENT DOCUMENTS

| 9110666 | 1/1992 | Germany . | |
| 0211042 | 12/1983 | Japan ..................... | 188/299 |
| 0149441 | 6/1988 | Japan ..................... | 188/322.14 |
| 3-099923 | 4/1991 | Japan ..................... | 188/299 |
| 2090643 | 7/1982 | United Kingdom .......... | 188/322.14 |

Primary Examiner—Robert J. Oberleitner
Assistant Examiner—Peter M. Poon
Attorney, Agent, or Firm—Nils H. Ljungman & Associates

[57] ABSTRACT

In a double tube vibration damper a bottom valve body is provided adjacent an end portion of a pressure tube which end portion is remote from the entrance of the piston rod into the pressure tube. The bottom valve body is positioned by a positioning sleeve which is in frictional engagement with an internal circumferential surface of the pressure tube.

46 Claims, 4 Drawing Sheets

VIBRATION DAMPER UNIT

BACKGROUND OF THE INVENTION

This invention relates to a vibration damper unit which can be used e.g. for motor vehicles between a wheel unit thereof and the cabin thereof. Vibration dampers for such use comprise a tube member, a piston rod guiding and sealing unit, a piston rod member extending through said piston rod guiding and sealing unit, a piston unit connected with said piston rod member inside said tube member and a bottom valve unit at the end of the tube member which is remote from the piston rod guiding and sealing unit. The bottom valve unit and more particularly the arrangement of the bottom valve unit at the bottom end of the tube member has influence on the dimensions of the vibration damper unit at the bottom end thereof.

With modern vehicles there is a tendency to increase the diameter and the axial width of the wheel and the tires mounted thereon. On the other hand, the spaces available for the wheels cannot easily be increased. Therefore, difficulties arise to use common available vibration damper units in connection with such vehicles having wheels of increased diameter and/or axial width of the respective tires.

OBJECT OF THE INVENTION

It is an object of the present invention to develop a vibration damper unit which may be used in connection with modern vehicles having such increased wheels and tires thereon.

It is a further object of the present invention to obtain a vibration damper unit in which a maximum damping and spring path is obtained at a predetermined overall length of the vibration damper unit.

It is a further object of this invention to provide a vibration damper unit which can be disassembled after an at least preliminary operational use and can be reassembled thereafter in using at least a part of the disassembled components. For understanding this object one should know that with vehicles which are constructed only in small series, such as pilot series, the problem arises of tuning the behaviour of the bottom valve unit. Therefore, one is sometimes forced to disassemble the vibration damper unit and to tune or replace the bottom valve unit. In such cases it is highly desirable to use the components again which have been already used before in one or several test runs.

It is a further object of the invention to provide a vibration damper unit which requires only little space.

A still further object of the present invention is to develop a vibration damper unit in which the bottom valve unit can be removed from the vibration damper unit with easy disassembling work and which can be easily reassembled again after replacement or modification of the bottom valve unit.

SUMMARY OF THE INVENTION

In consideration of at least part of the above-mentioned object a vibration damper comprises at least one tube member having an axis and two ends and defining a cavity therein. A piston rod guiding and sealing unit is provided adjacent a first end of the tube member. A piston rod member extends in axial direction through the piston rod guiding and sealing unit for axial movement with respect thereto. A piston unit is connected with the piston rod member inside the cavity. A bottom valve unit is provided adjacent a second end of the tube member. Two working chambers are confined inside the cavity, namely a first working chamber axially between the piston rod guiding and sealing unit and the piston unit and a second working chamber axially between the bottom valve unit and the piston unit. The piston unit is provided with piston unit valve means, and the bottom valve unit is provided with bottom valve means. A collector space is provided adjacent the bottom valve unit on a side of the bottom valve unit remote from the piston unit. The working chambers and at least part of the collector space contain a damping fluid, preferably a damping liquid. The bottom valve unit is axially positioned adjacent the second end of the tube member by a positioning sleeve member adjacent an internal circumferential face of the tube member.

By using the positioning sleeve member for positioning the bottom valve unit one can substantially avoid a positive engagement between the tube member and the bottom valve unit, e.g. positive engagement obtained by bead means between the tube member and the bottom valve unit. Such, a reduction of the stroke of the piston rod member by such positive positioning means can be avoided. Moreover, the assembling of the vibration damper unit can be facilitated. The same is true for possible disassembling situations.

The bottom valve unit may be in substantially axial engagement with abutment means provided adjacent the second end of the tube member such that the sleeve member secures the bottom valve unit in axial engagement with the abutment means. Such, the bottom valve unit can be secured against axial movement in both directions resulting from possible forces which may act in axial direction onto the bottom valve unit.

The abutment means at the second end of the tube member may be provided by a substantially axially directed annular shoulder face of the tube member adjacent the second end thereof. This shoulder face may be provided by a radially thickened wall portion of the tube member adjacent the second end thereof, and this radially thickened wall portion may be integral with a bottom wall of the tube member adjacent the second end thereof.

The formation of the shoulder face, the thickening of the wall portion and the shaping of the bottom wall may be obtained by conventional cold forging methods and the like when shaping the tube member.

The collector space may be substantially coaxial with the axis. This is particularly true for mono tube vibration dampers. The invention is basically, however, also applicable to other types of vibration dampers.

The collector space may be confined by the radially thickened wall portion, the bottom wall and the bottom valve unit.

The damping fluid is preferably under superatmospheric pressure. This superatmospheric pressure may be variable in accordance with the requirements of the respective vehicle. According to a most preferred embodiment the damping fluid per se is a damping liquid which fills the working chamber and at least a part of the collector space adjacent the bottom valve unit. In case of a damping liquid superatmospheric pressure may be obtained in that the damping liquid is in connection with a compensation chamber of variable volume.

If the damping fluid is a damping liquid, the collector space may be in connection with a balancing space for balancing variable volumina of the cavity varying in response to axial movement of the piston rod member with respect to the tube member. The balancing space may contain a volume of gas. This volume of gas may be under superatmospheric pressure. The damping liquid within the collector space may be in direct contact with the volume of gas. Alternatively, it is possible that the damping liquid within said collector space is separated from the balancing space by floating separating means.

The positioning sleeve member may comprise a material and preferably a metal, at least adjacent a radially outer circumferential surface thereof which material is softer or more ductile than the material of the tube member adjacent a radially inner circumferential surface thereof. By such selection of respective ductilities one can avoid damage to the radially inner circumferential surface of the tube member. Avoiding such damages is highly desirable in order to obtain a smooth sliding action between the piston unit and the tube member. When such a selection of respective ductilities of the materials of the positioning sleeve member and the tube member is made, one can select the relative diameters of the positioning sleeve member and the tube member such that high frictional forces are obtained between the positioning sleeve member and the tube member for securely positioning the bottom valve unit.

The positioning sleeve member may have an axial length larger than the axial length of the bottom valve unit. Such, the positioning sleeve member is precisely guided by the tube member when being introduced therein without the risk of tilting about transversal axes. On the other hand, the bottom valve unit can be made with a maximum external diameter sensibly smaller than the internal diameter of the tube member such that also the bottom valve unit can easily be introduced into the tube member without the risk of damaging the internal circumferential face of the tube member.

The positioning sleeve member may have along at least a part of its axial length an internal diameter allowing the entrance of a continuation of the piston rod member or of a central end portion of the piston unit into the sleeve member. Such, a reduction of stroke of the piston rod member by the presence of the positioning sleeve member can be avoided. This is partly true, when the continuation of the piston rod member and/or the central end portion of the piston unit is movable in response to inward movement of the piston rod member towards the second end of the tube member approx. as far as the bottom valve unit.

For securing the positioning sleeve member with respect to the tube member the positioning sleeve member may be by at least a part of a radially outer surface thereof in frictional engagement with a radially inner circumferential surface of the tube member.

Alternatively or additionally, the positioning sleeve member may be engaged by at least part of a radially outer surface thereof with a radially inner surface of the tube member by a pressure of damping fluid within the second working chamber acting on a radially inner circumferential surface of the positioning sleeve member.

Alternatively or additionally, the positioning sleeve member may have a substantially axially directed end face remote from the second end of the tube member, and the substantially axially directed end face may be pressure-loaded by the pressure of damping fluid within the second working chamber.

Alternatively or additionally, the positioning sleeve member may be axially fixed with respect to the tube member by at least one elastic clamping ring member engaged with both the positioning sleeve member and an internal circumferential surface of the tube member. This elastic clamping ring may be accommodated within a circumferential groove of the positioning sleeve member provided within a radially outer circumferential surface thereof. A plurality of elastic clamping ring members may be provided within a respective plurality of circumferential grooves distributed along the axial length of the positioning sleeve member. The clamping ring members may act as a labyrinth sealing unit. The provision of an elastic clamping ring member may be helpful for building up a pressure difference between the inner side and the outer side of the positioning sleeve member, so as to assist positioning by expansion of the positioning sleeve member in response to the damping fluid pressure inside the second working chamber.

The at least one clamping ring member may be an O-ring.

A further alternative or additional fixation of the positioning sleeve member may be provided by at least one permanently displaceable clamping ring portion, which is engageable with an internal circumferential surface of the tube member by a shaping tool to be inserted into the tube member through the first end thereof. Such, the positioning sleeve member may be secured after introduction into the tube member; this is a further possibility of avoiding damages to the inner circumferential surface of the tube member during insertion of the positioning sleeve member. This method of securing is of particular interest after one or several runs, when one expects that no further tuning is necessary. In case of using such a clamping portion, the positioning sleeve member can be made with an external diameter even somewhat smaller than the internal diameter of the tube member without deterioration of the positioning function.

The at least one clamping portion may be integral with the positioning sleeve member. The at least one clamping portion may further be annular about the axis.

Alternatively, a plurality of clamping portions may be distributed along a circumferential line of the positioning sleeve member. Preferably, the at least one clamping portion is provided adjacent an axial end portion of the positioning sleeve member remote from the bottom valve unit. For facilitating fixation, the at least one clamping portion may comprise engaging tip means engageable with the internal circumferential surface of the tube member.

The at least one clamping portion may comprise tool engagement means shaped for engagement with a chamfered shaping face of a clamping tool to be inserted along the axis into the cavity through the first end of the tube member.

In the final product as desired e.g. after a plurality of test runs, the at least one clamping portion may be in clamping engagement with a radially inner circumferential surface of the tube member.

For facilitating assembling, the positioning sleeve member may be in a preassembling engagement, such as to be coherent with the bottom valve unit, when introducing the bottom valve unit and the positioning sleeve member as an entity into the tube member. This coherence may be maintained after having positioned the entity into the tube member such that—when desired—the sleeve member and the positioning unit may be withdrawn together. The positioning sleeve member and the bottom valve unit may e.g. be provided with interengaging radially inner and radially outer preassembling faces. Preferably, the radially inner preassembling face is provided on the positioning sleeve member, and the radially outer preassembling face is provided on the bottom valve unit. The preassembling faces may even be in a mutual press-fit engagement. If one wants, however, a separation of the positioning sleeve member and the bottom valve unit, the press-fit should be such as to be a releasable frictional engagement. In this case, one can separate the bottom valve unit and the positioning sleeve member from each other by hand or by a tool. This is of particular interest, when one wants to tune the bottom valve unit after disassembling.

The positioning sleeve member may be chamfered adjacent at least one axial end thereof. This facilitates insertion of the positioning sleeve member into the tube member, particularly in cases in which the outer diameter of the sleeve member is equal to or even slightly larger than the internal diameter of the tube member.

The positioning sleeve member and/or the bottom valve unit may be provided with withdrawal tool engagement means for facilitating disassembling.

The bottom valve unit may be in accordance with common practice mounted on a base member made of sintered material. Such a sintered material is commonly harder, less ductile, brittler, and therefore it is preferred to separate the positioning sleeve member from the base member of the bottom valve unit so as to have two separate parts. It is to be noted, however, that the possibility of integral connection between the positioning sleeve member and the base unit is also envisaged.

In case of separation, the positioning sleeve member is preferably made of metallic material.

In case of using an elastic clamping ring member, this clamping ring member may be made of elastomeric material.

The piston rod guiding and sealing unit and the positioning sleeve member may be assembled such with the tube member for an at least preliminary operation that a disassembling is possible with at least part of the components: tube member, bottom valve unit, positioning sleeve member, piston rod member, piston unit and piston rod guiding and sealing unit remaining useful for reassembling after such disassembling. Under this point of view it is envisaged to provide the piston rod guiding and sealing unit as a total or in parts substantially within the tube member and to secure it within the tube member by an expandable slit annular securing member. Such a securing member may secure the piston rod guiding and sealing unit at least in axially outward direction with respect to the tube member.

The collector space may be provided with connecting means for connecting the collector space with an external reservoir. The connecting means may e.g. be shaped as a threaded connecting bore to which a rigid or flexible tube may be secured which may be connected at its other end with the reservoir. In the reservoir there may be maintained a substantially constant pressure, e.g. by a pressure-controlled pump or by a large space of pressurized gas.

The principles of the present invention allow the tube member to be slim along its total length and more particularly, the tube member may have an external diameter along an axial section thereof in a middle section and respective external diameters adjacent the first and the second axial ends thereof, with external diameter adjacent at least the second end being substantially equal to or even smaller than the axial diameter of the middle section.

The invention further relates to a method for assembling a vibration damper unit as described before. This method comprises the steps:

a) providing the tube member;
b) introducing the bottom valve unit and the positioning sleeve member into the tube member;
c) securing the bottom valve unit by the sleeve member against axial movement under operational conditions;
d) introducing the piston rod member and the piston unit into said cavity and
e) closing said cavity at the first end thereof by attaching the piston rod guiding and sealing unit.

Further, the present invention comprises a method of disassembling a vibration damper unit as described above. This method of disassembling may comprise:

a) removing the piston rod guiding and sealing unit from the tube member before or simultaneously with
b) withdrawing the piston rod member and the piston unit from the cavity through the first end of the tube member;
c) introducing a withdrawal tool into the cavity through the first end of the tube member;
d) engaging the withdrawal tool into an engagement location of one of the positioning sleeve member and the bottom valve unit and
e) withdrawing the positioning sleeve member and the bottom valve unit from the cavity.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to an embodiment shown in the accompanying drawings in which.

DETAILED DESCRIPTION OF THE PREFERRED EMBODIMENTS

Figure 1:
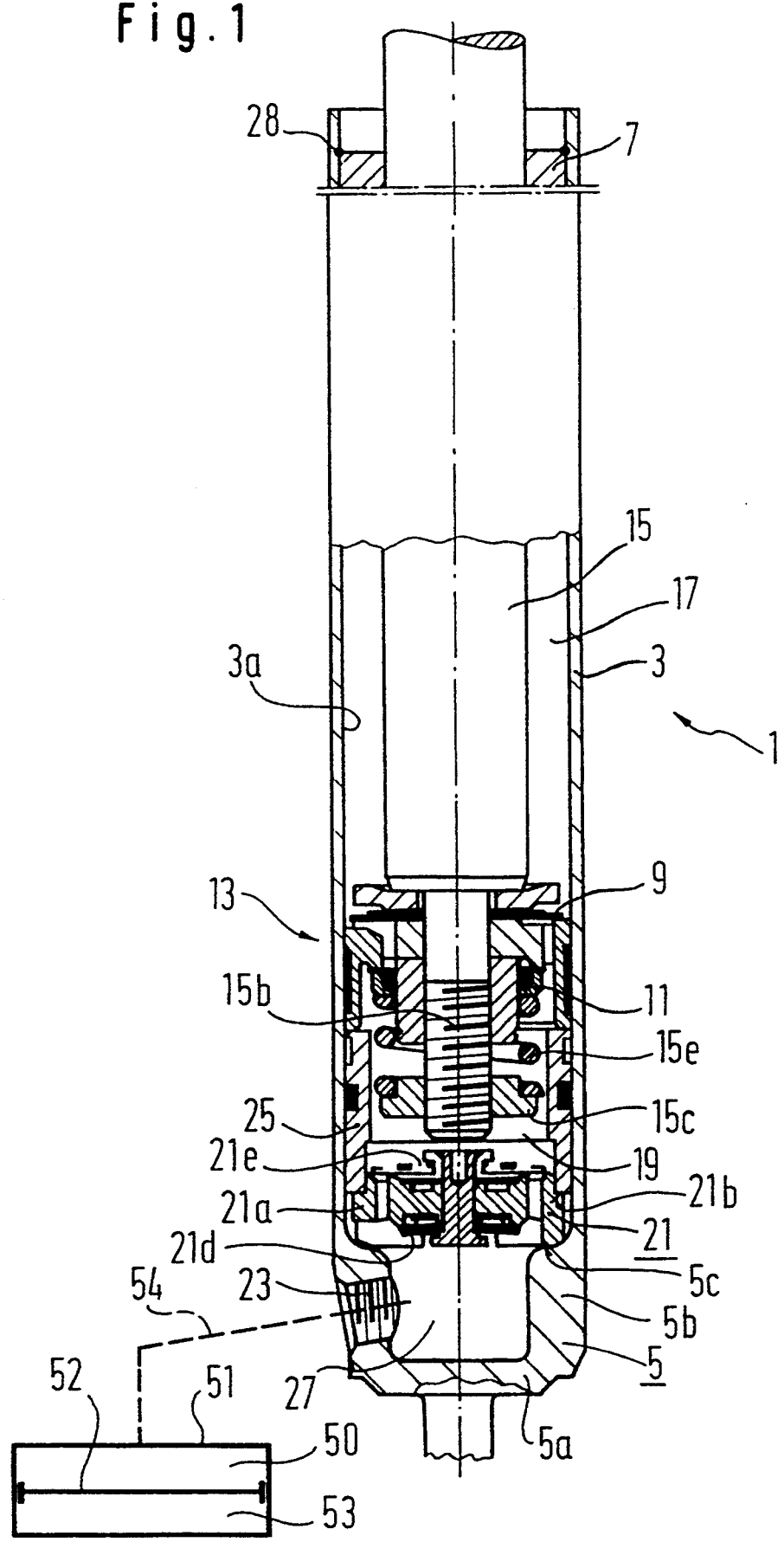
FIG. 1 is a longitudinal section of a hydro-pneumatic vibration damper in accordance with the present invention.

In FIG. 1 one recognizes a vibration damper the basic components of which are well known in the art. A pressure tube 1 has a bottom portion 5 integral with the pressure tube. A piston rod sealing and guiding unit, which may be preassembled or may consist of separate guiding and sealing components, is inserted into the first or upper end of the pressure tube 3. A cavity 17–19 is confined within the pressure tube 3 axially between the piston rod guiding and sealing unit at the upper or first end and the bottom portion 5 at the lower or second end. A piston rod 15 is sealingly guided by the guiding and sealing unit 7 and is connected with a piston unit 13 located inside the cavity 17–19. The piston unit 13 is provided with piston unit valve means 9,11. These valve means 9,11 comprise pulling operation valve means 11 and pushing operation valve means 9. The piston unit 13 subdivides the cavity into a first working chamber 17 and a second working chamber 19. Adjacent the lower or second end of the pressure tube 3 there is provided a bottom valve unit 21 which is provided with bottom valve means. These bottom valve means are of such design that in pushing operation, i.e. on inward movement of the piston rod member 15, a damping force occurs by the flow resistance through the bottom valve means, and that in pulling operation, i.e. on outward movement of the piston rod member, there is only a very small flow resistance if any at all. The lower or second end portion 5 defines a collector space 27 which is confined by a bottom wall 5a, a circumferential wall portion 5b of increased diameter and the bottom valve unit 21. The wall portion 5b defines a shoulder 5c on which the bottom valve unit 21 is seated by a bottom valve member 21a thereof. The bottom valve unit 21 is positioned axially between the shoulder 5c and a positioning sleeve 25. The positioning sleeve 25 engages an annular recess 21b of the bottom valve member 21a.

The working chambers 17 and 19 are filled with a damping liquid. The collector space 27 is also filled with this damping liquid. An internally threaded connection bore 23 is connected with a liquid reservoir 50 within a container 51. The liquid reservoir 50 is adjacent a floating wall 52 which separates the liquid reservoir 50 from a balancing space 53 filled with a pressurized gas. The connection between the collector space 27 and the liquid reservoir 50 can be established by a rigid or flexible tube member 54.

The function of such an oscillation damper is well known in the art: On inward movement of the piston rod 15 the volume of the working chambers 17 and 19 as a total is reduced by the entering volume of the piston rod 15; such damping liquid is expelled from the working chamber 19 partially through the pushing operation valve means 9, partially through the bottom valve means of the bottom valve unit 21. The bottom valve means 21d,21e again comprise pushing operation bottom valve means 21d and pulling operation bottom valve means 21e. In the pushing phase the pushing operation bottom valve means 21d are open and provide considerable flow resistance, whereas the pulling operation bottom valve means are substantially closed. The liquid entering into the working chamber 17 through the pushing operation piston valve means 9 maintains the working chamber 17 in substantially filled condition on downward movement of the piston rod 15, whereas the damping liquid flowing through the pushing operation bottom valve means 21d into the collector space 27 compensates for the reduction of volume within the working chambers 17 and 19, resulting from the increased volume of the piston rod 15 within the cavity 17–19. The flow resistance of the pushing operation piston valve means 9 and of the pushing operation bottom valve means 21d is adjusted such as to obtain a desired damping force in response to a predetermined velocity of the piston rod 15. On outward movement of the piston rod 15 through the upper end of the pressure tube 13 a damping liquid is expelled from the working chamber 17 through the pulling operation piston valve means 11 toward the lower working chamber 19. The decreasing volume of the piston rod 15 inside the cavity 17–19 is compensated for by liquid from the liquid reservoir 50, flowing via the line 54, the collector space 27 and the pulling operation bottom valve means 21e into the lower working chamber 19. The damping force in this phase of operation is determined by the prestress of the pulling operation piston valve means 11. The flow resistance through the pulling operation bottom valve means 21e may be very low in this phase of operation. One can recognize that at least in the pushing phase there is an increased pressure within the working chamber 19 as compared with the pressure in the working chamber 17 and in the collecting space 27. In the pulling phase there is substantially identic pressure in the working chamber 19 and in the collector space 27.

The piston rod guiding and sealing unit 7 is axially positioned by an expandable slit ring 28. For disassembling the vibration damper one can allow the damping liquid to flow out through the connecting bore 23. Hereupon the piston rod guiding and sealing unit may be removed after removing the slit ring 28. This can be done simply by withdrawing the piston rod 15 and the piston unit 13 out of the cavity 17–19.

After removing the piston rod 15 and the piston unit 13 from the cavity 17–19 the positioning sleeve 25 may be also withdrawn from the cavity by a withdrawal tool. The expandable slit ring 28 may be selected such as to secure the piston rod guiding and sealing unit in both axial directions.

Figure 2:
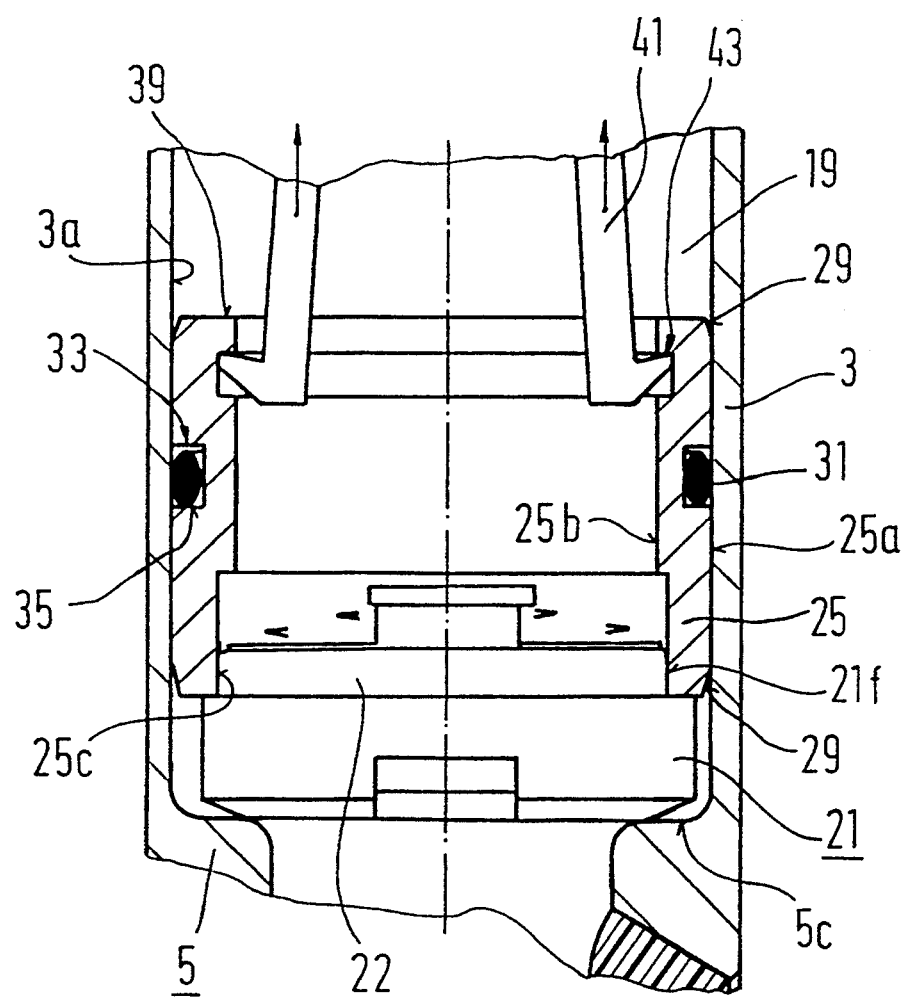
FIG. 2 is a positioning sleeve with a withdrawal tool engaged therewith.

In FIG. 2 one recognizes the positioning sleeve 25 and the bottom valve unit 21 in an increased scale. The positioning sleeve 25 has been obtained by mechanical treatment of a tube section. The positioning sleeve 25 has a radially outer circumferential surface 25a and a radially inner circumferential surface 25b. The radially outer circumferential surface 25a is provided with chamfered or conical surfaces 29 at both axial ends for facilitating movement of the positioning sleeve 25 inward and outward of the cavity 17–19. In the middle section of the positioning sleeve 25 there is provided an annular groove 35 adjacent the radially outer circumferential surface 25a. This annular groove 35 defines an annular chamber 33. A clamping O-ring 31 of elastomeric material is provided within the chamber 33 between the bottom face of the groove 35 and a radially inner circumferential face 3a of the pressure tube 3. The sleeve member 25 is further provided with a radially inner preassembling face 25c which is in preassembling engagement with a radially outer preassembling face 21f of the valve unit 21. Such the bottom valve unit 21 is radially centered with respect to the positioning sleeve 25 by a projection 22. There exists a frictional engagement between the preassembling faces 25c and 21f. The press-fit between these faces 25c and 21f is, however, selected such that no substantial expansion of the positioning sleeve 25 occurs at the lower end therof.

The bottom valve unit 21 is preassembled with the positioning sleeve 25 before being inserted into the cavity 17–19. Hereupon the pressassembly 25,21 is introduced into the upper end of the pressure tube 3 and pushed into the tube 3 until the bottom valve unit 21 engages the shoulder face 5c. This inward movement may be performed by an inserting tool. During operation a pressure of damping liquid exists within the working chamber 19. This pressure acts onto the internal circumferential surface 25b and onto the upper terminal face 39 of the sleeve member 25. The external diameter of the positioning sleeve 25 and the internal diameter of the pressure tube 3 are selected such that—when entering the positioning sleeve 25 into the pressure tube 3—the internal circumferential surface 3a is not damaged on the one hand and no radial play exists between the positioning sleeve 25 and the pressure tube 3.

The risk of damaging the internal circumferential surface 3a may be minimized by manufacturing the positioning sleeve 25 from a more ductile material than the pressure tube 3 and by selecting an axial length of the positioning sleeve 25 which warrants a perfect guiding behavior of the positioning sleeve 25 within the pressure tube 3. One can see from FIG. 2 that the axial length of the positioning sleeve 25 corresponds to at least half of the inner diameter of the pressure tube 3. The frictional forces between the pressure tube 3 and the positioning sleeve 5 are responsible for securing the bottom valve unit 21 in the operational position as shown in FIG. 2.

A further securing effect may result from the O-ring 31, clamped between the positioning sleeve 25 and the inner circumferential surface 3a. The internal pressure within the working chamber 19 acting onto the internal circumferential surface 25c of the positioning sleeve 25 may provide a further securing function.

For removing the positioning sleeve 25 one must, as already mentioned, remove the piston rod guiding and sealing unit 7 and the piston rod 15 with the piston unit 13. Thereafter a withdrawal tool 41, for example a pincer-shaped withdrawal tool, may be engaged into a groove 43 for withdrawing the preassembled unit consisting of the positioning sleeve 25 and the bottom valve unit 21. The chamfered faces 29 at the axial ends of the positioning sleeve 25 facilitate the insertion and the withdrawal of the positioning sleeve 25 and prevent damage on the internal circumferential surface 3a and, more particularly, avoid striation on said surface 3a.

Figure 3:
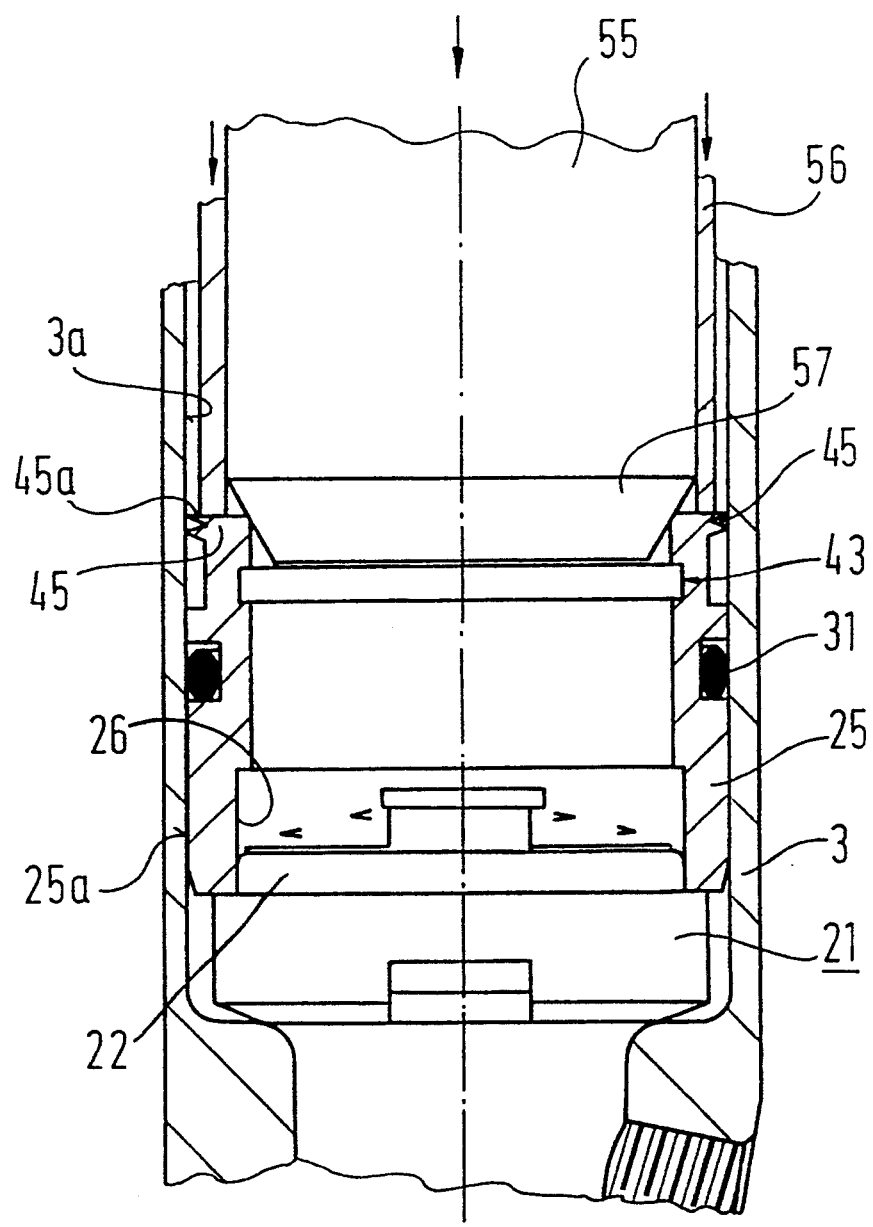
FIG. 3 and 3a are modified embodiment of a positioning sleeve with tooth-shaped clamping portions.

A further embodiment, very similar to FIG. 2, is shown in FIG. 3 with following differences: Besides the O-ring 31 the positioning sleeve 25 is provided with clamping segments 45 adjacent its radially outer circumferential surface 25a. After the positioning sleeve 25 has been inserted into the operational position as shown in FIG. 3 by an inserting tool 56, a shaping tool 55 with a conical shaped surface 57 may be introduced into the cavity such that the conical shaping tool 57 acts onto the clamping segments 45; such that these segments 45 are approached to the internal circumferential surface 3a and the tips or teeth 45a are pressed against the internal circumferential surface 3a where they remain in permanent engagement due to plastic deformation of the segments 45. This engagement is made only when one is sure that no further disassembling is desirable. For example, when considering a test vibration damper device, one may rely on the fixation by frictional engagement as long as the withdrawal of the bottom valve unit 21 is still necessary for tuning. After the tuning tests have been terminated, one may additionally secure the positioning sleeve 25 by the segments 45 for a pilot operation.

One has found that the use of the clamping ring 31 and the use of the segments 45 may be avoided according to the expected loads. On the other hand one can use a plurality of clamping rings 31 for increasing the frictional forces.

One can see from FIG. 1 that an extension 5b of the piston rod 15, a nut 15c and a helical compression spring 15e of the piston unit can enter into the central passage of the positioning sleeve 25, approximately as far as the bottom valve unit 21. This means that no reduction of the piston rod stroke occurs due to the presence of the positioning sleeve 25.

One further notes from FIG. 1 that the pressure tube 3 is slim on its total length and particularly on its lower end where it has the same external diameter as in the middle section. The O-ring 31 is made of a metal which avoids scratching and striation on the internal surface 3a. The circumferential groove 43 allows an easy engagement of the withdrawal tool.

Figure 3A:
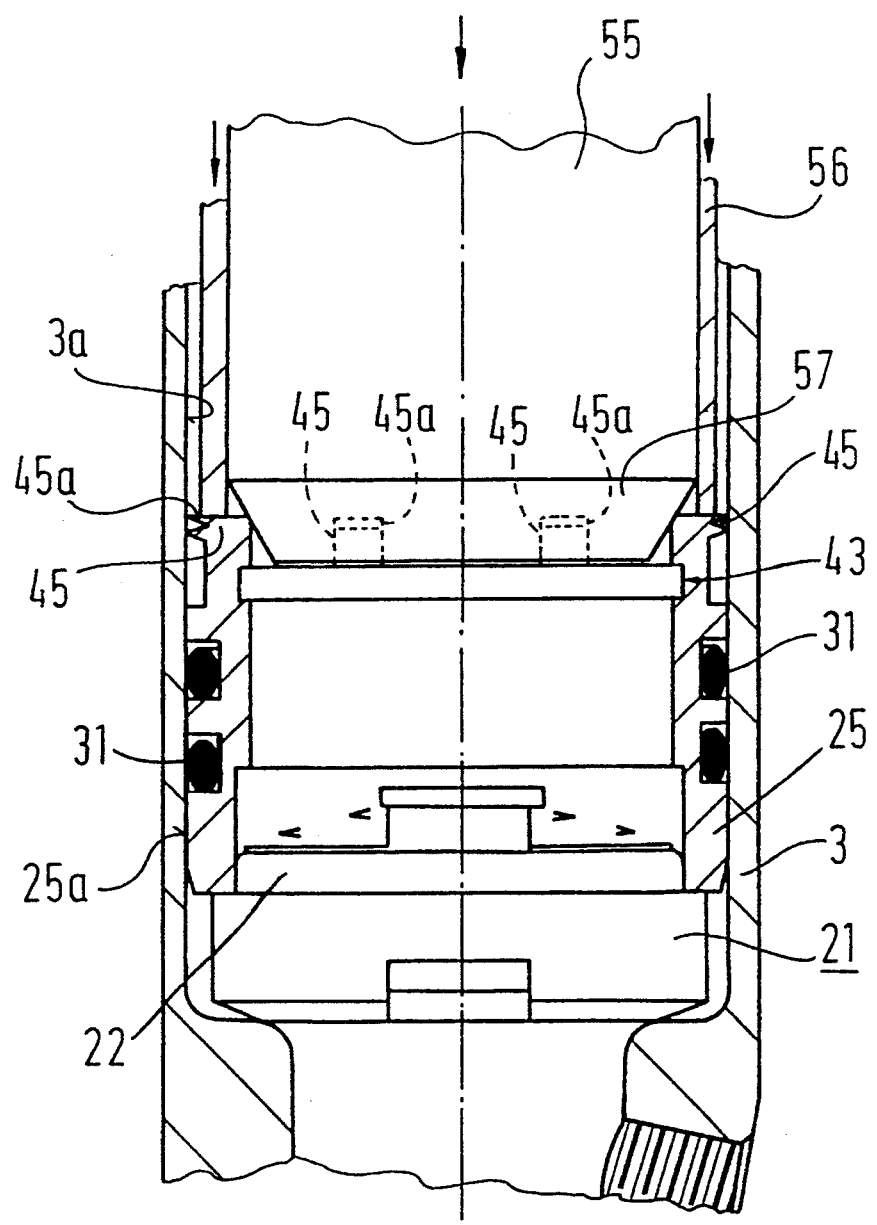

FIG. 3a shows a modified embodiment in which besides the O-ring 31, a further O-ring 31' is provided and a plurality of teeth 45a are shown in dotted lines, so as to demonstrate the possibility of a plurality of circumferentially spaced teeth 45a being distributed along the circumference.

While specific embodiments of the invention have been shown and described in detail to illustrate the application of the inventive principles, it will be understood that the invention may be embodied otherwise without departing from such principles.

I claim:

1. A vibration damper unit comprising at least one tube member having an axis and two ends and defining a cavity therein, a piston rod guiding and sealing unit adjacent a first end of said tube member, a piston rod member extending in axial direction therethrough said piston rod guiding and sealing unit, a piston unit connected with said piston rod member inside said cavity, a bottom valve unit provided adjacent a second end of said tube member, two working chambers inside said cavity, namely a first working chamber axially between said piston rod guiding and sealing unit and said piston unit and a second working chamber axially between said bottom valve unit and said piston unit, said piston unit being provided with piston unit valve means and said bottom valve unit being provided with bottom valve means, a collector space adjacent said bottom valve unit on a side of said bottom valve unit remote from said piston unit, said working chambers and at least part of said collector space containing a damping fluid, said bottom valve unit being axially positioned adjacent said second end of said tube member by a positioning sleeve member, said positioning sleeve member being adjacent an internal circumferential surface of said tube member on an axial side of said bottom valve unit remote from said second end of said tube member wherein said bottom valve unit being disposed between said sleeve member and said second end of said tube member.

2. A vibration damper unit as set forth in claim 1, further including said tube member comprising abutment means adjacent said second end of said tube member, said bottom valve unit being in substantially axial engagement with said abutment means, said sleeve member securing said bottom valve unit in said substantially axial engagement with said abutment means.

3. A vibration damper unit as set forth in claim 2, further including said abutment means being provided by a substantially axially directed annular shoulder face of said tube member adjacent said second end thereof.

4. A vibration damper unit as set forth in claim 3, further including said shoulder face being provided by a radially thickened wall portion of said tube member adjacent said second end thereof.

5. A vibration damper unit as set forth in claim 4, further including said radially thickened wall portion being integral with a bottom wall of said tube member adjacent said second end thereof.

6. A vibration damper unit as set forth in claim 5, further including said collector space being confined by said radially thickened wall portion, said bottom wall and said bottom valve unit.

7. A vibration damper unit as set forth in claim 1, further including said collector space being substantially coaxial with said axis.

8. A vibration damper unit as set forth in claim 1, further including said damping fluid being under superatmospheric pressure.

9. A vibration damper unit as set forth in claim 1, further including said damping fluid being a damping liquid, said collector space being in connection with a balancing space for balancing variable volumina of said cavity varying in response to axial movement of said piston rod member with respect to said tube member.

10. A vibration damper unit as set forth in claim 9, further including said balancing space containing a volume of gas.

11. A vibration damper unit as set forth in claim 9, further including said volume of gas being under superatmospheric pressure.

12. A vibration damper unit as set forth in claim 1, further including said damping fluid within said collector space comprising a damping liquid, and said damping liquid within said collector space being in direct contact with a volume of gas.

13. A vibration damper unit as set forth in claim 1, further including said damping fluid within said collector space comprising a damping liquid, and said damping liquid within said collector space being separated from a balancing space by floating separating means.

14. A vibration damper unit as set forth in claim 1, further including said positioning sleeve member comprising a material at least adjacent a radially outer circumferential surface thereof which is softer than the material of said tube member adjacent a radially inner circumferential surface thereof.

15. A vibration damper unit as set forth in claim 14, further including said positioning sleeve member having an axial length larger than the axial length of said bottom valve unit.

16. A vibration damper unit as set forth in claim 1, further including said positioning sleeve member having, along at least a part of its axial length, an internal diameter allowing the entrance of at least one of a continuation of said piston rod member and a central end portion of said piston unit into said sleeve member.

17. A vibration damper unit as set forth in claim 16, further including said at least one of said continuation of said piston rod member and said central end portion of said piston unit being movable in response to inward movement of said piston rod member toward said second end of said tube member approximately as far as said bottom valve unit.

18. A vibration damper unit as set forth in claim 1, further including said positioning sleeve member being, by at least a part of a radially outer surface thereof, in frictional engagement with a radially inner circumferential surface of said tube member.

19. A vibration damper unit as set forth in claim 1, further including said positioning sleeve member being engaged, by at least part of a radially outer surface thereof, with a radially inner surface of said tube member by a pressure of damping fluid within said second working chamber acting on a radially inner circumferential surface of said positioning sleeve member.

20. A vibration damper unit as set forth in claim 1, further including said positioning sleeve member having a substantially axially directed end face remote from said second end of said tube member, said substantially axially directed end face being pressure loaded by the pressure of damping fluid within said second working chamber.

21. A vibration damper unit as set forth in claim 1, further including said positioning sleeve member being axially fixed with respect to said tube member by at least one clamping ring member engaged with both said positioning sleeve member and an internal circumferential surface of said tube member.

22. A vibration damper unit as set forth in claim 21, further including said clamping ring being accommodated within a circumferential groove of said positioning sleeve member provided within a radially outer circumferential surface thereof.

23. A vibration damper unit as set forth in claim 21, further including a plurality of clamping ring members being provided within a respective plurality of circumferential grooves distributed along the axial length of said positioning sleeve member.

24. A vibration damper unit as set forth in claim 21, further including said at least one clamping ring member being an O-ring.

25. A vibration damper unit as set forth in claim 21, further including said clamping ring member being made of elastomeric material.

26. A vibration damper unit as set forth in claim 1, further including said positioning sleeve member being provided with at least one permanently displaceable clamping portion, said clamping portion being engageable with an internal circumferential surface of said tube member by a shaping tool to be inserted into said tube member through said first end thereof.

27. A vibration damper unit as set forth in claim 26, further including said at least one clamping portion being integral with said positioning sleeve member.

28. A vibration damper unit as set forth in claim 26, further including said at least one clamping portion being annular about said axis.

29. A vibration damper unit as set forth in claim 26, further including a plurality of clamping portions being distributed along a circumferential line of said positioning sleeve member.

30. A vibration damper unit as set forth in claim 26, further including said at least one clamping portion being provided adjacent an axial end portion of said positioning sleeve member remote from said bottom valve unit.

31. A vibration damper unit as set forth in claim 26, further including said at least one clamping portion comprising engaging tip means engageable with the internal circumferential surface of said tube member.

32. A vibration damper unit as set forth in claim 26, further including said at least one clamping portion comprising tool engagement means shaped for engagement with a conical shaping face of a clamping tool to be inserted along said axis into said cavity through said first end of said tube member.

33. A vibration damper unit as set forth in claim 26, further including said at least one clamping portion being in clamping engagement with a radially inner circumferential surface of said tube member.

34. A vibration damper unit as set forth in claim 1, further including said positioning sleeve member being in a preassembling engagement with said bottom valve unit.

35. A vibration damper unit as set forth in claim 34, further including said positioning sleeve member and said bottom valve unit being provided with interengaging radially inner and radially outer preassembling faces.

36. A vibration damper unit as set forth in claim 35, further including said radially inner preassembling face being provided on said positioning sleeve member and said radially outer preassembling face being provided on said bottom valve unit.

37. A vibration damper unit as set forth in claim 35, further including said preassembling faces being in mutual press-fit engagement.

38. A vibration damper unit as set forth in claim 1, further including said positioning sleeve member being chamfered adjacent at least one axial end thereof, and one of said positioning sleeve member and said bottom valve unit being provided with withdrawal tool engagement means.

39. A vibration damper unit as set forth in claim 1, further including said bottom valve unit comprising a base member made of sintered material.

40. A vibration damper unit as set forth in claim 1, further including said positioning sleeve member being made of metallic material.

41. A vibration damper unit as set forth in claim 1, further including said piston rod guiding and sealing unit and said positioning sleeve member being assembled with said tube member for an at least preliminary operation, such that a disassembling is possible with at least part of the components: tube member, bottom valve unit, positioning sleeve member, piston rod member, piston unit and piston rod guiding and scaling unit remaining useful for reassembling after disassembling.

42. A vibration damper unit as set forth in claim 1, further including said collector space being provided with connecting means for connecting said collector space with an external reservoir.

43. A vibration damper unit as set forth in claim 1, further including said tube member having an external diameter in a middle section and respective external diameters adjacent said first and said second axial ends thereof, said external diameter adjacent said second end being substantially equal to or smaller than the axial diameter of said middle section.

44. A method for assembling a vibration damper unit, said vibration damper unit comprising at least one tube member having an axis and two ends and defining a cavity therein, a piston rod guiding and sealing unit adjacent a first end of said tube member, a piston rod member extending in axial direction through said piston rod guiding and sealing unit, a piston unit connected with said piston rod member inside said cavity and slidably movable along an internal circumferential surface thereof, a bottom valve unit provided adjacent a second end of said tube member, two working chambers inside said cavity, namely a first working chamber axially between said piston rod guiding and sealing unit and said piston unit and a second working chamber axially between said bottom valve unit and said piston unit, said piston unit being provided with piston unit valve means and said bottom valve unit being provided with bottom valve means, a collector space adjacent said bottom valve unit on a side of said bottom valve unit remote from said piston unit, said working chambers and at least part of said collector space containing a damping fluid, said bottom valve unit being axially positioned adjacent said second end of said tube member by a positioning sleeve member, said positioning sleeve member being adjacent said internal circumferential surface of said tube member on an axial side of said bottom valve unit remote from said second end of said tube member wherein said bottom valve unit being disposed between said sleeve member and said second end of said tube member, the method comprising the steps of:
a) providing said tube member;
b) slidingly introducing said bottom valve unit and said positioning sleeve member into said tube member along said internal circumferential surface with said bottom valve unit preceeding said positioning sleeve member during an introduction movement in an axial direction toward said second end;
c) securing said bottom valve unit, by said sleeve member, against axial movement under predetermined operational or preoperational conditions;
d) introducing said piston rod member and said piston unit into said cavity; and
e) closing said cavity at said first end thereof by attaching said piston rod guiding and sealing unit.

45. A method for assembling as claimed in claim 44, further including said securing being obtained by at least one of:
a) frictionally engaging said positioning sleeve member with said internal circumferential surface of said tube member;
b) clamping said positioning sleeve member with said internal circumferential surface of said tube member by locally radially outwardly deforming said positioning sleeve member towards said tube member;
c) exposing said positioning sleeve member to an expanding fluid pressure acting on a radially inner surface of said positioning sleeve member; and
d) exposing said positioning sleeve member to a fluid pressure acting on a substantially axially directed end face of said positioning sleeve member.

46. A method of disassembling a vibration damper unit, said vibration damper unit comprising at least one tube member having an axis and two ends and defining a cavity therein, a piston rod guiding and sealing unit adjacent a first end of said tube member, a piston rod member extending in axial direction through said piston rod guiding and sealing unit, a piston unit connected with said piston rod member inside said cavity and slidably movable along an internal circumferential surface thereof, a bottom valve unit provided adjacent a second end of said tube member, two working chambers inside said cavity, namely a first working chamber axially between said piston rod guiding and sealing unit and said piston unit and a second working chamber axially between said bottom valve unit and said piston unit, said piston unit being provided with piston unit valve means and said bottom valve unit being provided with bottom valve means, a collector space adjacent said bottom valve unit on a side of said bottom valve unit remote from said piston unit, said working chambers and at least part of said collector space containing a damping fluid, said bottom valve unit being axially positioned adjacent said second end 0f said tube member by a positioning sleeve member, said positioning sleeve member being adjacent said internal circumferential surface of said tube member on an axial side of said bottom valve unit remote from said second end of said tube member wherein said bottom valve unit being disposed between said sleeve member and said second end of said tube member, the method comprising the steps of:
a) removing said piston rod guiding and sealing unit from said tube member before or simultaneously with
b) withdrawing said piston rod member and said piston unit from said cavity through said first end of said tube member;
c) introducing a withdrawal tool into said cavity through said first end of said tube member;
d) engaging said withdrawal tool into an engagement location of one of said positioning sleeve member and said bottom valve unit; and
e) withdrawing said positioning sleeve member and said bottom valve unit from said cavity along said internal circumferential surface with said positioning sleeve member preceding said bottom valve unit during withdrawal movement in an axial direction towards said first end.

* * * * *

UNITED STATES PATENT AND TRADEMARK OFFICE
CERTIFICATE OF CORRECTION

PATENT NO. : 5,400,881
DATED : March 28, 1995
INVENTOR(S) : Robert PRADEL

It is certified that error appears in the above-indentified patent and that said Letters Patent is hereby corrected as shown below:

In column 6, line 52, before '3', delete "FIG." and insert --FIGS.--.

In column 6, line 52, after 'modified', delete "embodiment" and insert --embodiments--.

In column 9, line 64, after 'extension', delete "5b" and insert --15b--.

Signed and Sealed this

Fifth Day of November, 1996

Attest:

BRUCE LEHMAN

*Attesting Officer*   *Commissioner of Patents and Trademarks*